(12) United States Patent
Ng et al.

(10) Patent No.: US 8,700,308 B2
(45) Date of Patent: Apr. 15, 2014

(54) NAVIGATION SYSTEM FOR A MOTOR VEHICLE

(75) Inventors: Brian Ng, San Jose, CA (US); Thomas Chan, Mountain View, CA (US); Chu Hee Lee, San Jose, CA (US); Daniel Rosario, Santa Cruz, CA (US); Arne Stoschek, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 1224 days.

(21) Appl. No.: 11/472,622

(22) Filed: Jun. 21, 2006

(65) Prior Publication Data

US 2007/0233369 A1  Oct. 4, 2007

Related U.S. Application Data

(63) Continuation-in-part of application No. 11/395,705, filed on Mar. 31, 2006, now abandoned, which is a continuation-in-part of application No. 11/439,315, filed on May 22, 2006.

(60) Provisional application No. 60/800,222, filed on May 11, 2006.

(51) Int. Cl.
 *G01C 21/32* (2006.01)
 *G01C 21/00* (2006.01)
 *G01C 21/30* (2006.01)

(52) U.S. Cl.
 USPC ............ 701/400; 701/421; 701/430; 701/461

(58) Field of Classification Search
 USPC ........................................ 340/995.15, 995.27
 See application file for complete search history.

(56) References Cited

U.S. PATENT DOCUMENTS

| 5,508,917 A | 4/1996 | Siegle et al. |
| 5,839,086 A | 11/1998 | Hirano |

(Continued)

FOREIGN PATENT DOCUMENTS

| DE | 40 39 887 | 6/1992 |
| DE | 698 15 940 | 6/2004 |

(Continued)

OTHER PUBLICATIONS

PCT International Search Report and Written Opinion of the International Searching Authority, PCT International Patent Application No. PCT/EP2007/001905, dated Sep. 12, 2007, (English-language translation provided).

(Continued)

*Primary Examiner* — Khoi Tran
*Assistant Examiner* — Nicholas Kiswanto
(74) *Attorney, Agent, or Firm* — Kenyon & Kenyon LLP

(57) ABSTRACT

A navigation system for a motor vehicle includes: a motor vehicle, a server which is spatially separate from the motor vehicle, and a wireless communication connection between the server and the motor vehicle for the time-staggered transmission of a first navigation information item and at least a second navigation information item from the server to the motor vehicle, the first navigation information item being assigned a first priority and the second navigation information item being assigned a second priority, the sequence of the transmission of the first navigation information item and the second navigation information item being a function of the priority level, and a man-machine interface being arranged in the motor vehicle for outputting the first navigation information item and the second navigation information item to an operator of the motor vehicle.

8 Claims, 11 Drawing Sheets

(56) References Cited

U.S. PATENT DOCUMENTS

| | | |
|---|---|---|
| 6,148,261 A | 11/2000 | Obradovich et al. |
| 6,157,155 A | 12/2000 | Kobayashi |
| 6,285,317 B1 | 9/2001 | Ong |
| 6,324,467 B1* | 11/2001 | Machii et al. ............... 701/200 |
| 6,336,073 B1 | 1/2002 | Ihara et al. |
| 6,647,270 B1 | 11/2003 | Himmelstein |
| 6,707,378 B2 | 3/2004 | MacNeille et al. |
| 6,745,111 B2* | 6/2004 | Maruyama et al. ............ 701/1 |
| 6,765,495 B1 | 7/2004 | Dunning et al. |
| 6,826,472 B1* | 11/2004 | Kamei et al. ............... 701/202 |
| 6,862,524 B1 | 3/2005 | Nagda et al. |
| 6,868,331 B2 | 3/2005 | Hanebrink |
| 6,898,516 B2 | 5/2005 | Pechatnikov et al. |
| 6,965,829 B2 | 11/2005 | Yamadaji et al. |
| 6,996,469 B2 | 2/2006 | Lau et al. |
| 7,046,168 B2 | 5/2006 | Tsuboi |
| 7,062,375 B2 | 6/2006 | Hatano |
| 7,103,368 B2 | 9/2006 | Teshima |
| 7,110,882 B2 | 9/2006 | Moser et al. |
| 7,233,864 B2 | 6/2007 | Moser et al. |
| 7,269,503 B2* | 9/2007 | McGrath ..................... 701/117 |
| 7,272,357 B2 | 9/2007 | Nishiga et al. |
| 7,286,825 B2 | 10/2007 | Shishido et al. |
| 7,383,123 B2* | 6/2008 | Park ........................... 701/200 |
| 2001/0019309 A1 | 9/2001 | Saeki et al. |
| 2001/0020211 A1* | 9/2001 | Takayama et al. ........... 701/200 |
| 2001/0020213 A1 | 9/2001 | Hatano |
| 2002/0032035 A1 | 3/2002 | Teshima |
| 2002/0177948 A1 | 11/2002 | Upparapalli et al. |
| 2003/0028314 A1 | 2/2003 | Nagamune |
| 2003/0083809 A1 | 5/2003 | Hatano |
| 2003/0102997 A1 | 6/2003 | Levin et al. |
| 2003/0234720 A1 | 12/2003 | MacNeille et al. |
| 2004/0015292 A1 | 1/2004 | Wiio et al. |
| 2004/0064245 A1 | 4/2004 | Knockeart et al. |
| 2004/0066330 A1 | 4/2004 | Knockeart et al. |
| 2004/0082350 A1 | 4/2004 | Chen et al. |
| 2004/0204848 A1 | 10/2004 | Matsuo et al. |
| 2004/0249565 A1* | 12/2004 | Park ........................... 701/200 |
| 2005/0197842 A1 | 9/2005 | Bergmann et al. |
| 2005/0216147 A1* | 9/2005 | Ferman ....................... 701/29 |
| 2005/0222760 A1 | 10/2005 | Cabral et al. |
| 2005/0248484 A1 | 11/2005 | Stoschek et al. |
| 2005/0270311 A1 | 12/2005 | Rasmussen et al. |
| 2006/0074549 A1 | 4/2006 | Takahashi et al. |
| 2006/0074553 A1* | 4/2006 | Foo et al. ................... 701/212 |
| 2006/0161341 A1 | 7/2006 | Haegebarth et al. |
| 2006/0164412 A1 | 7/2006 | Dupont et al. |
| 2006/0200312 A1 | 9/2006 | Osaka |
| 2007/0093958 A1* | 4/2007 | Jonsson et al. ............... 701/211 |
| 2007/0233369 A1 | 10/2007 | Ng et al. |
| 2007/0233371 A1 | 10/2007 | Stoschek et al. |
| 2007/0233375 A1 | 10/2007 | Garg et al. |
| 2007/0233377 A1 | 10/2007 | Salay et al. |
| 2007/0271035 A1 | 11/2007 | Stoschek et al. |
| 2008/0065322 A1 | 3/2008 | Ng et al. |
| 2008/0133132 A1 | 6/2008 | Jung et al. |
| 2008/0201070 A1 | 8/2008 | Kikuchi |
| 2008/0249703 A1 | 10/2008 | Matsuno et al. |

FOREIGN PATENT DOCUMENTS

| | | |
|---|---|---|
| DE | 10 2004 061 782 | 9/2005 |
| DE | 10 2005 013 648 | 9/2006 |
| EP | 0 243 635 | 1/1993 |
| EP | 0 694 895 | 1/1996 |
| EP | 0 875 730 | 11/1998 |
| EP | 1 033 692 | 9/2000 |
| EP | 1 035 531 | 9/2000 |
| EP | 1 168 286 | 1/2002 |
| EP | 1 376 059 | 1/2004 |
| EP | 0 990 119 | 11/2005 |
| EP | 1 757 904 | 2/2007 |
| FR | 2 634 707 | 2/1990 |
| JP | 06 036186 | 2/1994 |
| JP | 10 241094 | 9/1998 |
| JP | 2002-131065 | 5/2002 |
| JP | 2004-227162 | 8/2004 |
| WO | 98/59215 | 12/1998 |
| WO | WO 2005/124280 | 12/2005 |

OTHER PUBLICATIONS

Periodical Autoconnect 2005, Vereinigte Motor-Verlage GmbH & Co. KG (United Motor publishing house, Inc.), Leuschnerstr. 1, 70174 Stuttgart, Federal Republic of Germany, pp. 18 and 21.

Bleyer et al., "Car-to-Car Communication," p. 16-19, Apr. 2002. (Translated).

PCT International Search Report and Written Opinion, PCT International Application No. PCT/EP2007/001906, dated Jun. 14, 2007 (English-language translation provided).

PCT International Search Report and Written Opinion of the International Searching Authority, PCT International Patent Application No. PCT/EP2007/001904, dated Jun. 21, 2007, (English-language translation provided).

Office Action, U.S. Appl. No. 11/439,315, dated Aug. 30, 2010.
Office Action, U.S. Appl. No. 11/439,315, dated Dec. 7, 2010.
Office Action, U.S. Appl. No. 11/501,554, dated Oct. 13, 2010.

* cited by examiner

NAVIGATION SYSTEM FOR A MOTOR VEHICLE

CROSS-REFERENCE TO RELATED APPLICATIONS

The present application claims the benefit of U.S. Provisional Patent Application Ser. No. 60/800,222, filed on May 11, 2006, which is expressly incorporated herein in its entirety by reference thereto.

The present application is a continuation-in-part of U.S. patent application Ser. No. 11/395,705, filed on Mar. 31, 2006, which is expressly incorporated herein in its entirety by reference thereto, and a continuation-in-part of U.S. patent application Ser. No. 11/439,315, entitled "Navigation System for a Motor Vehicle, Method for Operating a Navigation System and Motor Vehicle Including a Navigation System," filed on May 22, 2006, which is expressly incorporated herein in its entirety by reference thereto.

FIELD OF THE INVENTION

The preset invention relates to a navigation system for a motor vehicle.

BACKGROUND INFORMATION

European Published Patent Application No. 0 875 730 and German Published Patent Application No. 698 15 940 describe a map data display device for use in a vehicle navigation device having a data-conversion device for recording points of map data according to a map, from a viewpoint through a viewing line originating from the viewpoint and having an angle of depression with respect to the plane of the map; and for perspectively projecting the points of the map data onto a viewing plane, which is fixed perpendicularly to the viewing line and is a predefined distance from the location, in order to generate map display data. This produces a bird's-eye view of an environment. A navigation system having a bird's-eye view of an environment is also described in French Published Patent Application No. 2 634 707 and the document Autoconnect 2005, Vereinigte Motor-Verlage GmbH & Co. KG (United Motor Publishing House, Inc.), Leuschnerstr. 1, 70174 Stuttgart, Federal Republic of Germany, pages 18 and 21.

European Published Patent Application No. 0 990 119 describes a digital personal communication device having a processor, a memory that the processor can access, and a display which is connected to the processor. The display displays map data and a position of the digital personal communication device with respect to the map data, and the map data includes route points, i.e., coordinates, as instructed by the processor. Furthermore, the digital personal communication device includes an input device for forming queries for map data and for selecting route points, and a GPS receiver which is connected to the processor. The processor is programmed to process data it receives from the GPS receiver such that the position of the digital personal communication device is able to be determined from the data. Moreover, the digital personal communication device includes a transmitter which is connected to the processor, the processor being programmed such that, utilizing the transmitter, it requests map data from a map memory and a transmission device, processes the map information it obtained from the map memory and the transmission device, and determines the availability of additional stored data regarding route points in the memory during the selection of one of the route points by the input device, and, using the transmitter, it requests additional stored data from the map memory and the transmission device during the selection of one of the route points if additional, stored data are not available in the memory.

SUMMARY

According to example embodiments of the present invention, a navigation system for a motor vehicle includes a motor vehicle, a server which is spatially separate from the motor vehicle, and a wireless communication connection between the server and the motor vehicle for the time-staggered transmission of a first navigation information item and at least a second navigation information item from the server to the motor vehicle, the first navigation information item being assigned a first priority, and the second navigation information item being assigned a second priority (which is different from the first priority), the sequence of the transmission of the first navigation information item and the second navigation information item being a function of the priority level, and a man-machine interface being arranged in the motor vehicle for the output of the first navigation information item and the second navigation information item to an operator of the motor vehicle. It may be provided, for example, that a navigation information item having a high priority is transmitted before a navigation information item having a low priority.

A navigation information item may include, for example, a map display and an information item concerning the navigation system for the augmented display in a map display. A navigation information item may include, for example, a route atlas, a graphical map illustration as well as an information item regarding a navigation system for the augmenting display in the map illustration together with a position of the motor vehicle and/or a suggested route for the motor vehicle. A navigation information item may be, for example, an information item regarding a navigation system that is inherently independent of a position of the motor vehicle and/or a suggested route for the motor vehicle. However, it may be provided that the priority it is assigned is dependent on the position of the motor vehicle and/or the suggested route for the motor vehicle. A navigation system may be, for example, an information item regarding a navigation system, but, for example, not the position of the motor vehicle. A navigation information item may be, for example, an information item regarding a navigation system, but, for example, not a suggested route for the motor vehicle. A navigation information item may be, for example, an information item regarding a point of interest, a graphical image of a point of interest, a landmark and/or an excerpt from a map display, etc. Such a map display may be a map, a satellite image, a 3D graphical representation, etc. The map, the satellite image or the 3D graphical representation may be shown in an overhead view, a bird's-eye view, in a first-person view, etc.

A wireless communication connection may also include a component that is not wireless. A wireless communication connection may be, for example, a communication connection that is wireless at least in the direction of the motor vehicle. A wireless communication connection may be, for example, a wireless connection to the Internet (for example, WLAN). Wireless communication connections may also be WIFI, WIMAX, RF, mobile radio, etc. It may be provided that a selection from among alternative wireless communication connections is made (automatically) as a function of certain criteria. Such criteria may include, for example, cost, availability and/or bandwidth, etc.

A time-staggered transmission of a first navigation information item and a second navigation information item means that a navigation information item may be transmitted before the other navigation information item.

The priority of a navigation information item may be a function of its update rate or its usual update rate. For example, it may be provided that the navigation information items having high dynamics are assigned a higher priority. For example, traffic information and information regarding the availability of parking spaces may be assigned high priorities.

The priority of a navigation information item may be a function of its size. It may be provided, for example, that the items of navigation information having a low bandwidth or size are assigned a higher priority. For example, traffic information, information regarding the availability of parking spaces and information regarding points of interest may be assigned higher priorities than a map display because of their lower size. With respect to a map display, it may be provided, for example, that a two-dimensional map have a higher priority than a three-dimensional vector map display. With respect to a map display, it may furthermore be provided, for example, that a three-dimensional vector map display has a higher priority than a satellite image or a photo-realistic (three-dimensional) map display.

The priority of a navigation information item may be a function of its distance to the position of the motor vehicle and/or its distance to a suggested route for the motor vehicle. This is provided for map displays, for example.

The priority of a navigation information item may be a function of its recognition value. It may be provided, for example, that a navigation information item having a high recognition value is assigned a higher priority than a navigation information item having a low recognition value. A high recognition value may be, for example, a certain singularity or a visual noticeability. A navigation information item having a high recognition value may be, for example, a navigation information item that offers a particularly useful clue for orientation. A navigation information item having a high recognition value may be, for example, a navigation information item that clearly differs from its surroundings. For example, it may be provided that landmarks with a high recognition value are shown in greater detail than landmarks having a low recognition value. For example, the Transamerica Building in San Francisco may be shown in more detail than a regular housing block.

The priority of a navigation information item may be a function of its safety relevance. It may be provided, for example, that the items of navigation information having safety relevance are assigned a higher priority.

The priority of a navigation information item may be able to be set by an operator. The priority of a navigation information item may be a function of a user profile.

The man-machine interface may include a monitor.

The motor vehicle may include a navigation system.

The first navigation information item and the second navigation information item may be encoded, and the motor vehicle may include a decoder for decoding the first encoded navigation information item and the second encoded navigation information item, and the sequence of the decoding of the first navigation information item and the second navigation information item may be a function of the priority level. For example, it may be provided that a navigation information item having a high priority is encoded before a navigation information item having a low priority. An encoded navigation information item may be, for example, a compressed navigation information item. Decoding of an encoded navigation information item may be, for example, a decompression of a compressed navigation information item.

The motor vehicle may include a memory having a map display. This map display may be displayed, for example, in place of the first navigation information item and/or the second navigation information item if the corresponding navigation information item is not (yet) available.

The server may be arranged as off-board navigation system for calculating a suggested route for the motor vehicle. The suggested route may be provided to be transmitted before the first navigation information item and the second navigation information item.

A motor vehicle, e.g., a motor vehicle for a navigation system including one or a plurality of the aforementioned features, may include an interface for a wireless communication connection for the time-staggered reception of a first navigation information item and at least a second navigation information item, the first navigation information item being assigned a first priority and the second navigation information item being assigned a second priority (which differs from the first priority), and the sequence of the reception of the first navigation information item and the second navigation information item being a function of the level of the priority, and the motor vehicle including a man-machine interface for outputting the first navigation information item and the second navigation information item to an operator of the motor vehicle. It may be provided, for example, that a navigation information item having a high priority is received before a navigation information item having a low priority.

The priority of a navigation information item may be a function of its update rate or its usual update rate. The priority of a navigation information item may be a function of its distance to the position of the motor vehicle and/or its distance to a suggested route for the motor vehicle. The priority of a navigation information item may be a function of its recognition value and/or its size and/or its safety relevance. The priority of a navigation information item may be able to be set by an operator and/or is a function of a user profile.

The man-machine interface may include a monitor. The motor vehicle may include a navigation system.

The first navigation information item and the second navigation information item may be encoded, and the motor vehicle may include a decoder for decoding the first encoded navigation information item and the second encoded navigation information item, and the sequence of the decoding of the first navigation information item and the second navigation information item may be a function of the level of the priority. For example, it may be provided that a navigation information item having a high priority is encoded before a navigation information item having a low priority.

The motor vehicle may also include a memory having a map display.

Furthermore, in a method for augmenting the navigation of a motor vehicle: a first priority is assigned to a first navigation information item and a second priority (which differs from the first priority) is assigned to a second navigation information item; the first navigation information item and the second navigation information item are transmitted to the motor vehicle in a time-staggered manner; and the sequence of the transmission of the first navigation information item and the second navigation information item is implemented as a function of the priority level. For example, it may be provided that a navigation information item having a high priority is transmitted before a navigation information item having a low priority.

The first navigation information item and/or the second navigation information item may be output to an operator of the motor vehicle.

The priority of a navigation information item may be determined as a function of its update rate or its usual update rate and/or its size. The priority of a navigation information item may be determined as a function of its distance to the position of the motor vehicle and/or its distance to a suggested route for the motor vehicle.

The priority of a navigation information item may be determined as a function of its recognition value and/or as a function of its safety relevance and/or as a function of a user profile.

The first navigation information item and the second navigation information item may be encoded prior to their transmission to the motor vehicle, and the first encoded navigation information item and the second encoded navigation information item may be decoded after their transmission to the motor vehicle, and the sequence of the decoding of the first navigation information item and the second navigation information item may be implemented as a function of the level of the priority.

Furthermore, a motor vehicle, e.g., a motor vehicle for a navigation system including one or more of the aforementioned features, includes a memory for storing an encoded first navigation information item and at least a second encoded navigation information item, the first navigation information item being assigned a first priority and the second navigation information item being assigned a second priority, and the sequence of the reception of the first navigation information item and the second navigation information item being a function of the priority level, and the motor vehicle including a decoder for decoding the first item of encoded navigation information and the second item of encoded navigation information, the sequence of the decoding of the first navigation information item and the second navigation information item being a function of the priority level, and the motor vehicle including a man-machine interface for outputting the first navigation information item and the second navigation information item to an operator of the motor vehicle. For example, it may be provided that a navigation information item having a high priority is decoded before a navigation information item having a low priority.

The priority of a navigation information item may be a function of its update rate or its usual update rate and/or the size of the navigation information item. The priority of a navigation information item may be a function of its distance to the position of the motor vehicle and/or its distance to a suggested route for the motor vehicle. The priority of a navigation information item may be a function of its recognition value and/or its safety relevance. The priority of a navigation information item may be able to be set by an operator and/or is a function of a user profile.

The man-machine interface may include a monitor. The motor vehicle may include a navigation system.

Furthermore, in a method for augmenting the navigation of a motor vehicle: a first navigation information item is encoded, the first navigation information item being assigned a first priority; a second navigation information item is encoded, the second encoded navigation information item being assigned a second priority; the first encoded navigation information item and the second encoded navigation information item are decoded, and the sequence of the decoding of the first encoded navigation information item and the second encoded navigation information item is implemented as a function of the priority level. For example, it may be provided that a navigation information item having a high priority is decoded before a navigation information item having a low priority. The encoding of a navigation information item may occur before, after or during the assignment of a priority to the navigation information item.

The first navigation information item and/or the second navigation information item may be output to an operator of the motor vehicle.

The priority of a navigation information item may be determined as a function of its update rate or its usual update rate and/or its size. The priority of a navigation information item may be determined as a function of its distance to the position of the motor vehicle and/or its distance to a suggested route for the motor vehicle.

The priority of a navigation information item may be determined as a function of its recognition value and/or as a function of its safety relevance and/or as a function of a user profile.

A navigation system for a motor vehicle may include: an off-board navigation system, which is spatially separate from the motor vehicle, for calculating a suggested route for the motor vehicle; a wireless communication connection between the off-board navigation system and the motor vehicle for transmission of the suggested route and a subsequent transmission of a navigation information item to the motor vehicle; and a man-machine interface, arranged in the motor vehicle, for outputting the suggested route and the navigation information item to an operator of the motor vehicle.

The navigation information item may encompass an excerpt from a map display assigned to the suggested route.

A motor vehicle may include, for example, a land vehicle that may be used individually in road traffic. For example, motor vehicles may not be restricted to land vehicles having an internal combustion engine.

According to an example embodiment of the present invention, a navigation system for a motor vehicle includes: a motor vehicle; a server spatially separate from the motor vehicle; a wireless communication connection between the server and the motor vehicle adapted for time-staggered transmission of a first navigation information item and a second navigation information item from the server to the motor vehicle, the first navigation information item having a first priority and the second navigation information item having a second priority, a sequence of the transmission of the first navigation information item and the second navigation information item being a function of a level of the priority; and a man-machine interface arranged in the motor vehicle adapted to output the first navigation information item and the second navigation information item to an operator of the motor vehicle.

The priority of a navigation information item may be a function of at least one of (a) update rate and (b) usual update rate.

The priority of a navigation information item may be a function of size.

The priority of a navigation information item may be a function of distance to a position of the motor vehicle.

The priority of a navigation information item may be a function of distance to a suggested route for the motor vehicle.

The priority of a navigation information item may include an excerpt from a map display.

The priority of the excerpt from the map display may be a function of distance to a position of the motor vehicle.

The priority of the excerpt from the map display may be a function of distance to a suggested route for the motor vehicle.

The priority of a navigation information item may be a function of recognition value.

The priority of a navigation information item may be a function of safety relevance.

The priority of a navigation information item may be settable by an operator.

The priority of a navigation information item may be a function of a user profile.

The man-machine interface may include a monitor.

The motor vehicle may include a navigation system.

The first navigation information item and the second navigation information item may be encoded, the motor vehicle may include a decoder adapted to decode the first encoded navigation information item and the second encoded navigation information item, and a sequence of the decoding of the first navigation information item and the second navigation information item may be a function of the level of the priority.

The motor vehicle may include a memory having a map display.

The server may be arranged as an off-board navigation system adapted to calculate a suggested route for the motor vehicle.

The suggested route may be provided for transmission before the first navigation information item and the second navigation information item.

According to an example embodiment of the present invention, a motor vehicle includes: an interface for a wireless communication connection for time-staggered reception of a first navigation information item and a second navigation information item, the first navigation information item having a first priority and the second navigation information item having a second priority, a sequence of the reception of the first navigation information item and the second navigation information item being a function of the priority level; and a man-machine interface adapted to output the first navigation information item and the second navigation information item to an operator of the motor vehicle.

The priority of a navigation information item may be a function of at least one of (a) update rate and (b) usual update rate.

The priority of a navigation information item may be a function of size.

The priority of a navigation information item may be a function of distance to a position of the motor vehicle.

The priority of a navigation information item may be a function of distance to a suggested route for the motor vehicle.

The priority of a navigation information item may include an excerpt from a map display.

The priority of the excerpt from the map display may be a function of distance to a position of the motor vehicle.

The priority of the excerpt from the map display may be a function of distance to a suggested route for the motor vehicle.

The priority of a navigation information item may be a function of recognition value.

The priority of a navigation information item may be a function of safety relevance.

The priority of a navigation information item may be settable by an operator.

The priority of a navigation information item may be a function of a user profile.

The man-machine interface may include a monitor.

The motor vehicle may include a navigation system.

The first navigation information item and the second navigation information item may be encoded, the motor vehicle may further include a decoder adapted to decode the first encoded navigation information item and the second encoded navigation information item, and a sequence of the decoding of the first navigation information item and the second navigation information item may be a function of the level of the priority.

The motor vehicle may include a memory having a map display.

According to an example embodiment of the present invention, a method for augmenting navigation of a motor vehicle includes: assigning a first priority to a first navigation information item; assigning a second priority to a second navigation information item; and time-staggered transmission of the first navigation information item and the second navigation information item to the motor vehicle, a sequence of the transmission of the first navigation information item and the second navigation information item being implemented as a function of the priority level.

The method may include outputting at least one of (a) the first navigation information item and (b) the second navigation information item to an operator of the motor vehicle.

The method may include outputting the first navigation information item and the second navigation information item to an operator of the motor vehicle.

The priority of a navigation information item may be a function of at least one of (a) update rate and (b) usual update rate.

The priority of a navigation information item may be a function of size.

The priority of a navigation information item may be a function of distance to a position of the motor vehicle.

The priority of a navigation information item may be a function of distance to a suggested route for the motor vehicle.

The priority of a navigation information item may be a function of recognition value.

The priority of a navigation information item may be a function of safety relevance.

The priority of a navigation information item may be a function of a user profile.

The method may include: encoding the first navigation information item and the second navigation information item before transmission to the motor vehicle; and decoding the first navigation information item and the second navigation information item after transmission to the motor vehicle, a sequence of the decoding of the first navigation information item and the second navigation information item implemented as a function of the priority level.

According to an example embodiment of the present invention, a motor vehicle includes: a memory adapted to store an encoded first navigation information item and an encoded second navigation information item, the first navigation information item having a first priority and the second navigation information item having a second priority, a sequence of reception of the first navigation information item and the second navigation information item being a function of the priority level; a decoder adapted to decode the encoded first navigation information item and the encoded second navigation information item, a sequence of the decoding of the first navigation information item and the second navigation information item being a function of the priority level; and a man-machine interface adapted to output the first navigation information item and the second navigation information item to an operator of the motor vehicle.

The priority of a navigation information item may be a function of at least one of (a) update rate and (b) usual update rate.

The priority of a navigation information item may be a function of size.

The priority of a navigation information item may be a function of distance to a position of the motor vehicle.

The priority of a navigation information item may be a function of distance to a suggested route for the motor vehicle.

The priority of a navigation information item may include an excerpt from a map display.

The priority of the excerpt from the map display may be a function of distance to a position of the motor vehicle.

The priority of the excerpt from the map display may be a function of distance to a suggested route for the motor vehicle.

The priority of a navigation information item may be a function of recognition value.

The priority of a navigation information item may be a function of safety relevance.

The priority of a navigation information item may be settable by an operator.

The priority of a navigation information item may be a function of a user profile.

According to an example embodiment of the present invention, a method for augmenting navigation of a motor vehicle includes: encoding a first navigation information item; assigning a first priority to the first navigation information item; encoding a second navigation information item; assigning a second priority to the second navigation information item; and decoding the encoded first navigation information item and the encoded second navigation information item, a sequence of the decoding of the first navigation information item and the second navigation information item being performed as a function of the priority level.

The method may include outputting the first navigation information item and the second navigation information item to an operator of the motor vehicle.

According to an example embodiment of the present invention, a navigation system for a motor vehicle includes: an off-board navigation system, spatially separate from the motor vehicle, adapted to calculate a suggested route for the motor vehicle; a wireless communication connection between the off-board navigation system and the motor vehicle adapted to transmit the suggested route and a subsequent transmission of a navigation information item to the motor vehicle; and a man-machine interface, arranged in the motor vehicle, adapted to output the suggested route and the navigation information item to an operator of the motor vehicle.

The navigation information item may include an excerpt from a map display.

The navigation information item may include an excerpt from a map display.

The navigation information item may include an excerpt from a map display assigned to the suggested route.

Further aspects and details of example embodiments of the present invention are described in more detail below with reference to the appended Figures.

DETAILED DESCRIPTION

Figure 1:
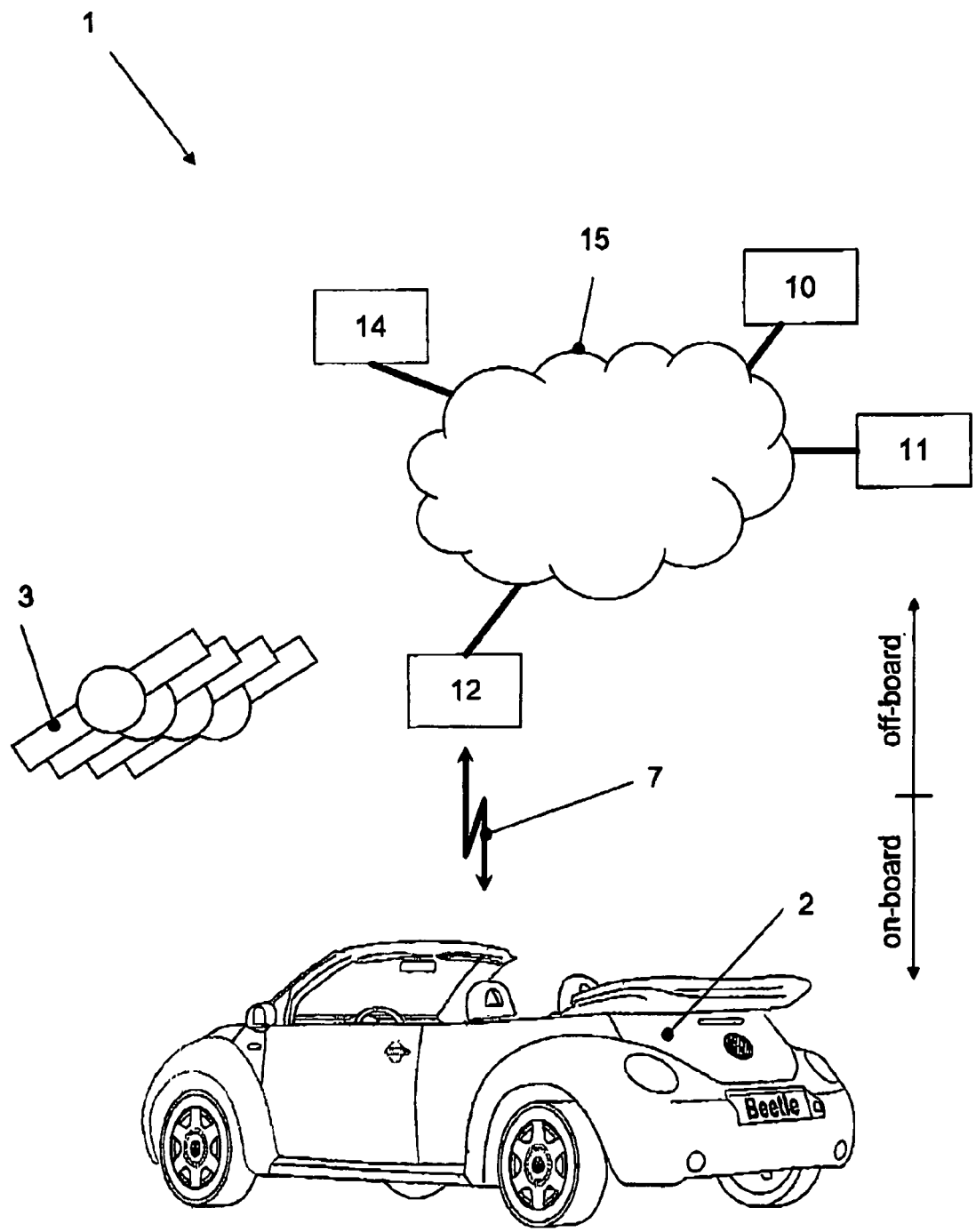
FIG. 1 schematically illustrates an exemplary embodiment of a navigation system for a motor vehicle.

FIG. 1 illustrates an exemplary embodiment of a navigation system 1 for a motor vehicle 2. Navigation system 1 includes a server 10, which is spatially separate from motor vehicle 2 and has access to Internet 15. Server 10 may be an exemplary embodiment for an off-board navigation system. For example, it may be provided that a calculation of a suggested route (setpoint route to a destination and/or setpoint direction of travel) for motor vehicle 2 is implemented with the aid of server 10. Such a suggested route may be a function of the instantaneous traffic, construction sites, weather or environmental conditions and/or visual conditions, etc. The suggested route may also depend on personal preferences (interesting routes, landmarks, shopping areas, etc.).

Navigation system 1 also includes a wireless Internet connection between motor vehicle 2 and server 10 for transmission of a navigation information item such as a route atlas, a graphical map display as well as an information item regarding the navigation system, e.g., for the augmenting representation in a map display, such as graphical displays and information regarding landmarks, traffic information and their graphical displays, and/or graphical displays and information regarding points of interest, etc., to motor vehicle 2. Traffic information may be, for example, information regarding congestion, construction sites, information about new roads, information about no longer existing roads, information about blocked roads, and/or information about new or reversed one-way streets, etc.

To implement the wireless Internet connection, navigation device 1 has nodes 11, 12, 14, which allow wireless access to Internet 15. A wireless communication connection 7 may be arranged between nodes 11, 12, 14 and motor vehicle 2. Wireless communication connection 7 may include a WLAN, for example. However, it may also be provided to implement a wireless communication connection 7 as WIFI connection, WIMAX connection, RFI connection, mobile radio communication connection, etc. It may also be provided that a selection from among alternative wireless communication connections is made (automatically) as a function of certain criteria. Examples of these criteria include cost, availability, and/or bandwidth, etc.

Figure 2:
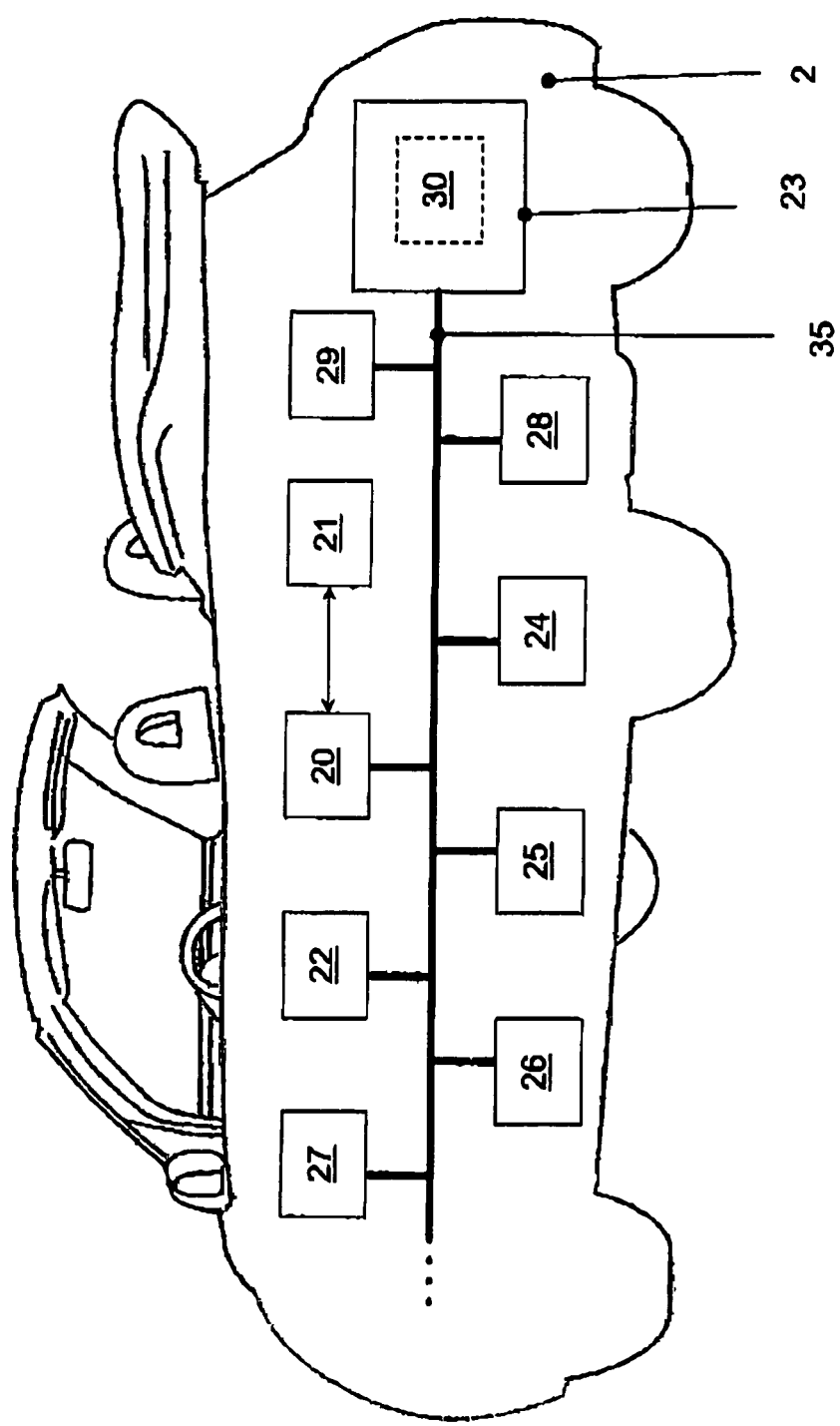
FIG. 2 is a schematic view of a exemplary embodiment of a motor vehicle having a navigation system.

FIG. 2 illustrates an exemplary embodiment of an exemplary implementation of motor vehicle 2 in a schematic view. Motor vehicle 2 includes a man-machine interface arranged as a touch screen 21 for outputting the suggested route to an operator of motor vehicle 2. To this end touch screen 21 is controllable with the aid of a display control unit 20, which, via a bus system 35, is connected to an interface 22 for wireless communication connection 7. Touch screen 21 may also be utilized for operating an infotainment system 24, a telephone 25, or a climate control system 26, etc.

Motor vehicle 2 includes a position-finding system 30 integrated into an on-board navigation system 23, for determining the position of motor vehicle 2, the heading of motor vehicle 2, and/or the on-board time as a function of signals transmitted by satellites denoted by reference numeral 3 in FIG. 1. Using on-board navigation system 23, a suggested route for motor vehicle 2 to a destination able to be input via touch screen 21 is ascertainable.

Figure 3:
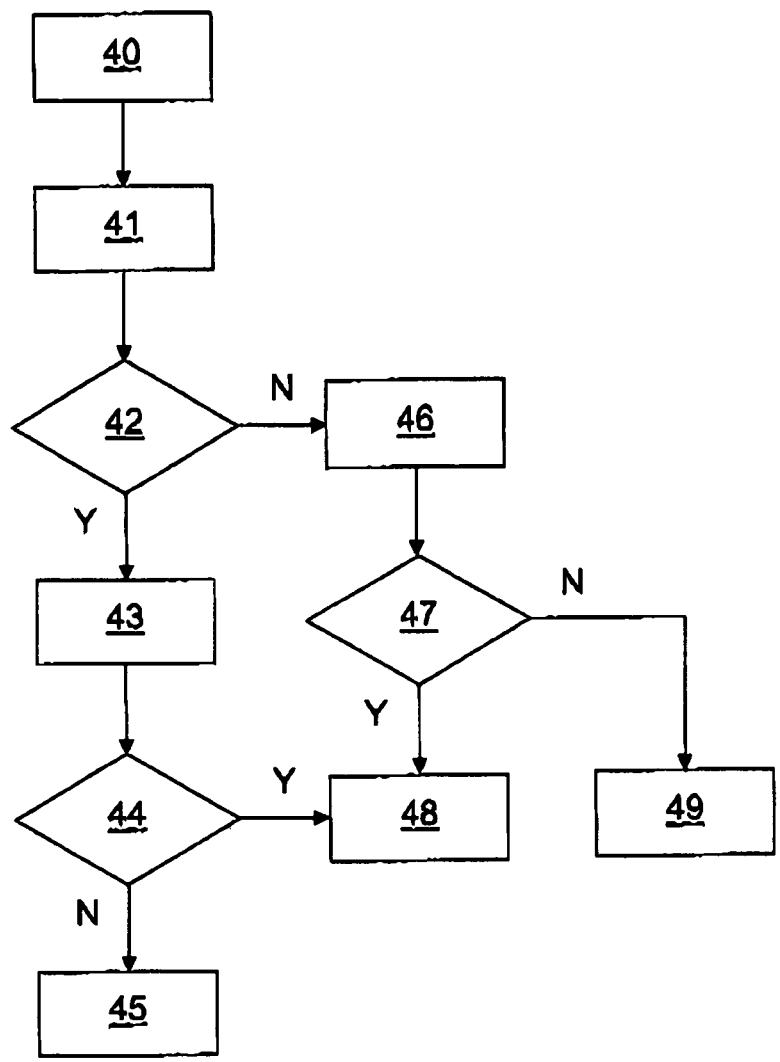
FIG. 3 illustrates an exemplary embodiment of a method for augmenting the navigation of a motor vehicle.
Figure 4:
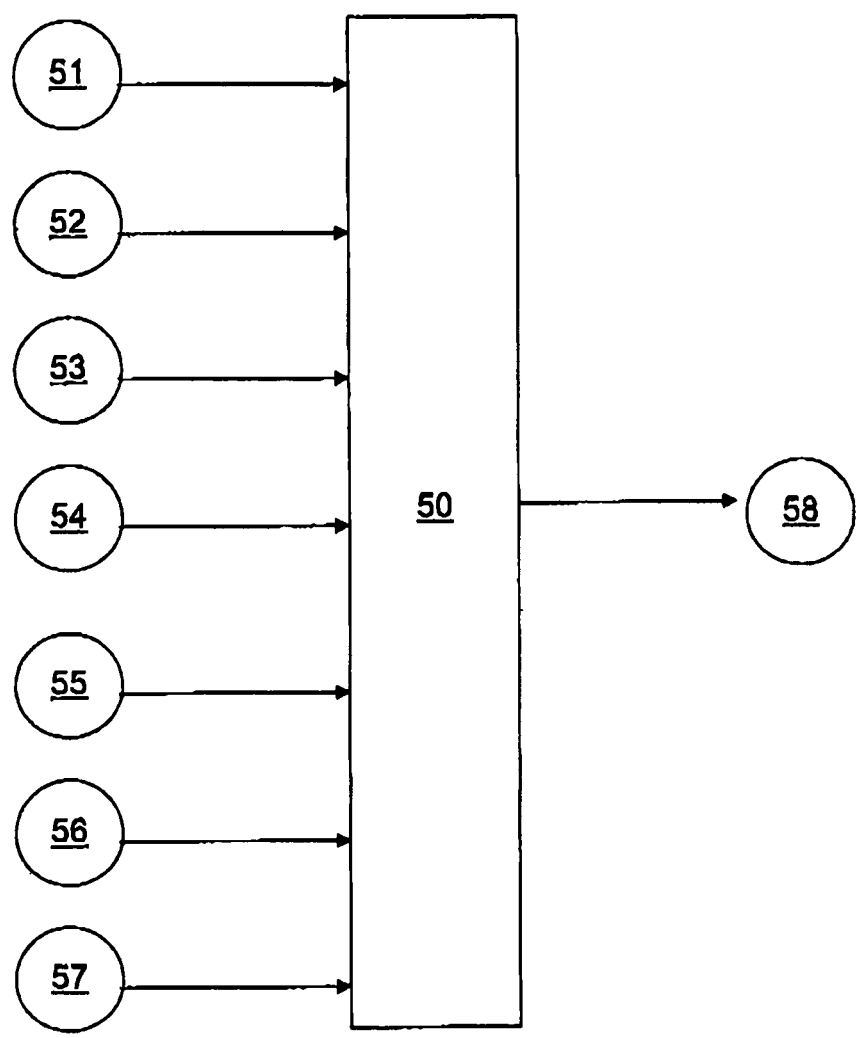
FIG. 4 illustrates an exemplary embodiment of a prioritizer.
Figure 9:
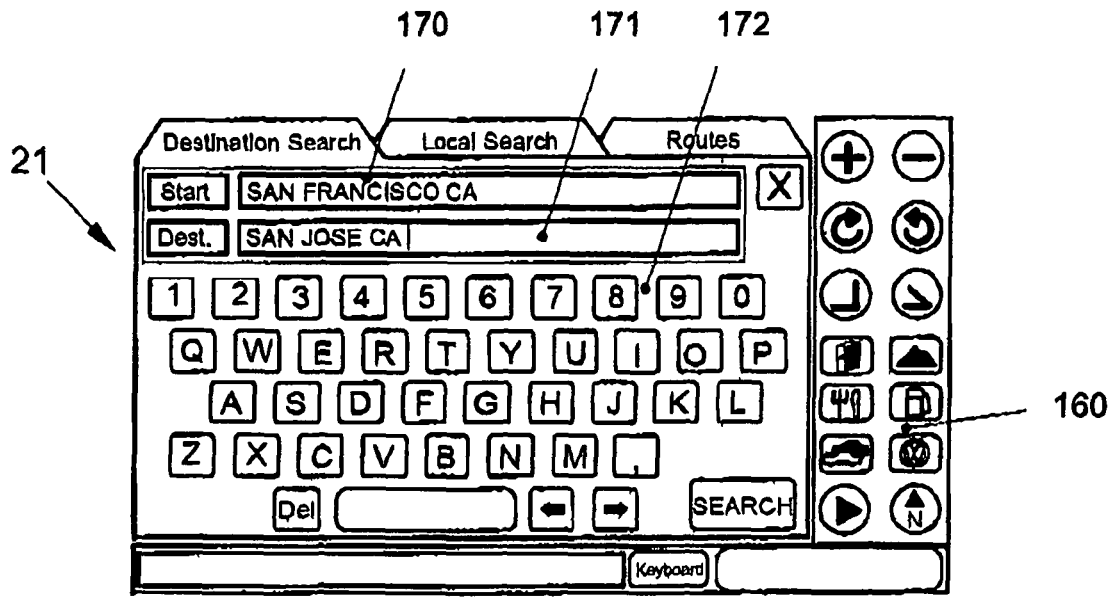
FIG. 9 illustrates an exemplary embodiment of the display of an input mask for inputting a starting point and a destination point with the aid of a touch screen.
Figure 10:
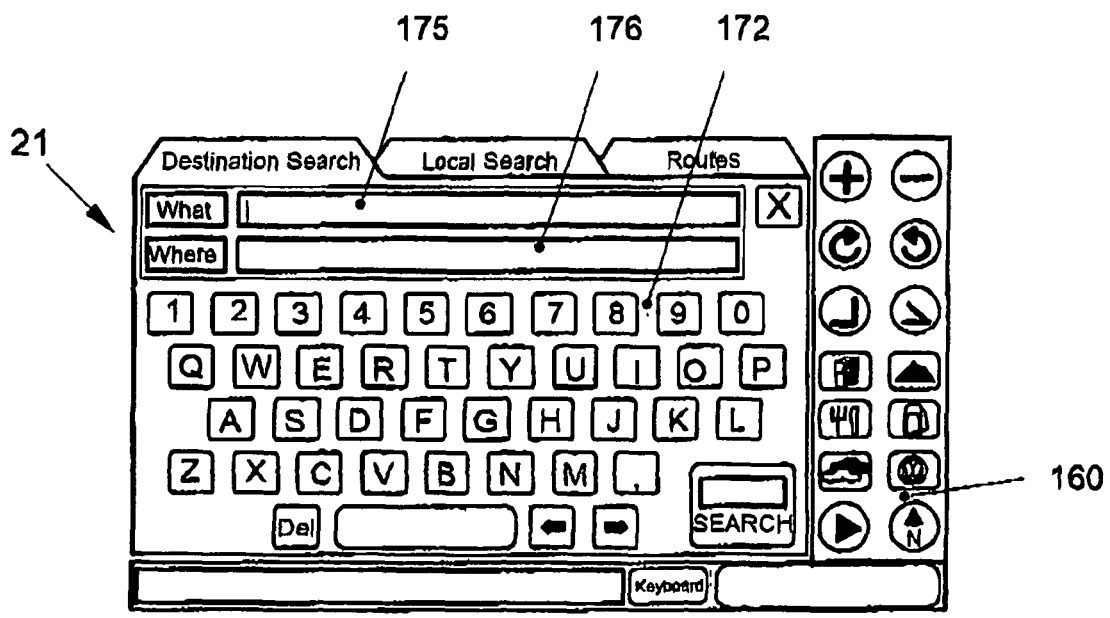
FIG. 10 illustrates an exemplary embodiment of a display of an input mask for selecting a destination via a touch screen.

FIG. 3 illustrates an exemplary embodiment of a method for augmenting the navigation of motor vehicle 2. In a step 40—as illustrated in FIG. 9 and FIG. 10, for example—a destination, a point of interest or similar item is input. Step 40 is followed by a step 41 in which a search is conducted in an on-board database for this destination or this point of interest together with corresponding navigation information such as map displays, graphical representations and information about landmarks, traffic information and their graphical display and/or graphical displays and information pertaining to the point of interest or additional points of interest, etc. Such a map display may be a map, a satellite image or a 3D graphical representation, etc. The map, the satellite image or the 3D graphical representation may be shown in an overhead view, a bird's-eye view, or in a first-person view. An on-board database may be stored in a memory denoted by reference numeral 28, for example.

Step 41 is followed by a query 42 as to whether the searched for destination or the searched for point of interest together with corresponding navigation information is available in the on-board database. If the searched for destination or the searched for point of interest together with corresponding navigation information is available in the on-board database, query 42 is followed by a step 43 in which a search is conducted on server 10 for an update patch for the searched for destination or the searched for point of interest together with corresponding navigation information. If no such update patch is found, the navigation information found in the on-board database is displayed (possibly together with a position of motor vehicle 2 and/or a suggested route for motor vehicle 2) in a step 45, with the aid of touch screen 21. However, if such an update patch is found, query 44 is followed by a step 48.

If query 42 shows that the searched for destination or the searched for point of interest together with corresponding navigation information is not available in the on-board database, query 42 is followed by a step 46, which corresponds to step 43, as well as a query 47, which corresponds to query 44. If an update patch is found, query 47 is followed by step 48. However, if no update patch is found, query 47 is followed by a step 49 in which a secondary navigation information item, which corresponds to the searched for navigation information item, is displayed with the aid of touch screen 21 (possibly together with a position of motor vehicle 2 and/or a suggested route for motor vehicle 2). Such a secondary navigation information item may be a conventional navigation information item stored in navigation system 23 or on an associated CD or DVD, etc.

In step 48, the available navigation information is transmitted from server 10 to motor vehicle 2—in encoded or compressed manner—the individual items of navigation information being assigned priorities and the sequence of the transmission of the navigation information being implemented as a function of the individual priority level. For example, it may be provided that a navigation information item having a high priority is transmitted before a navigation information item having a low priority.

Server 10 and/or motor vehicle 2 have/has a prioritizer 50, which determines priority 58 of a navigation information item. It may be provided that priority 58 is a function of update rate 51 of the navigation information item or its usual update rate. It may be provided that the navigation information having high dynamics is assigned a higher priority. For example, traffic information and information regarding the availability of parking spaces may be assigned high priorities. As an alternative or in addition, it may be provided that priority 58 of the navigation information is a function of its size 52. For example, it may be provided that the navigation information having a low bandwidth or size is assigned a higher priority. For example, traffic information, information regarding the availability of parking spaces and information regarding points of interest may be assigned higher priorities than a map display because of their small size. With respect to a map display it may be provided, for example, that a two-dimensional map has a higher priority than a three-dimensional vector map display. Furthermore, with respect to a map display, it may be provided, for example, that a three-dimensional vector map display has a higher priority than a satellite image or a photo-realistic (three-dimensional) map display.

Figure 5:
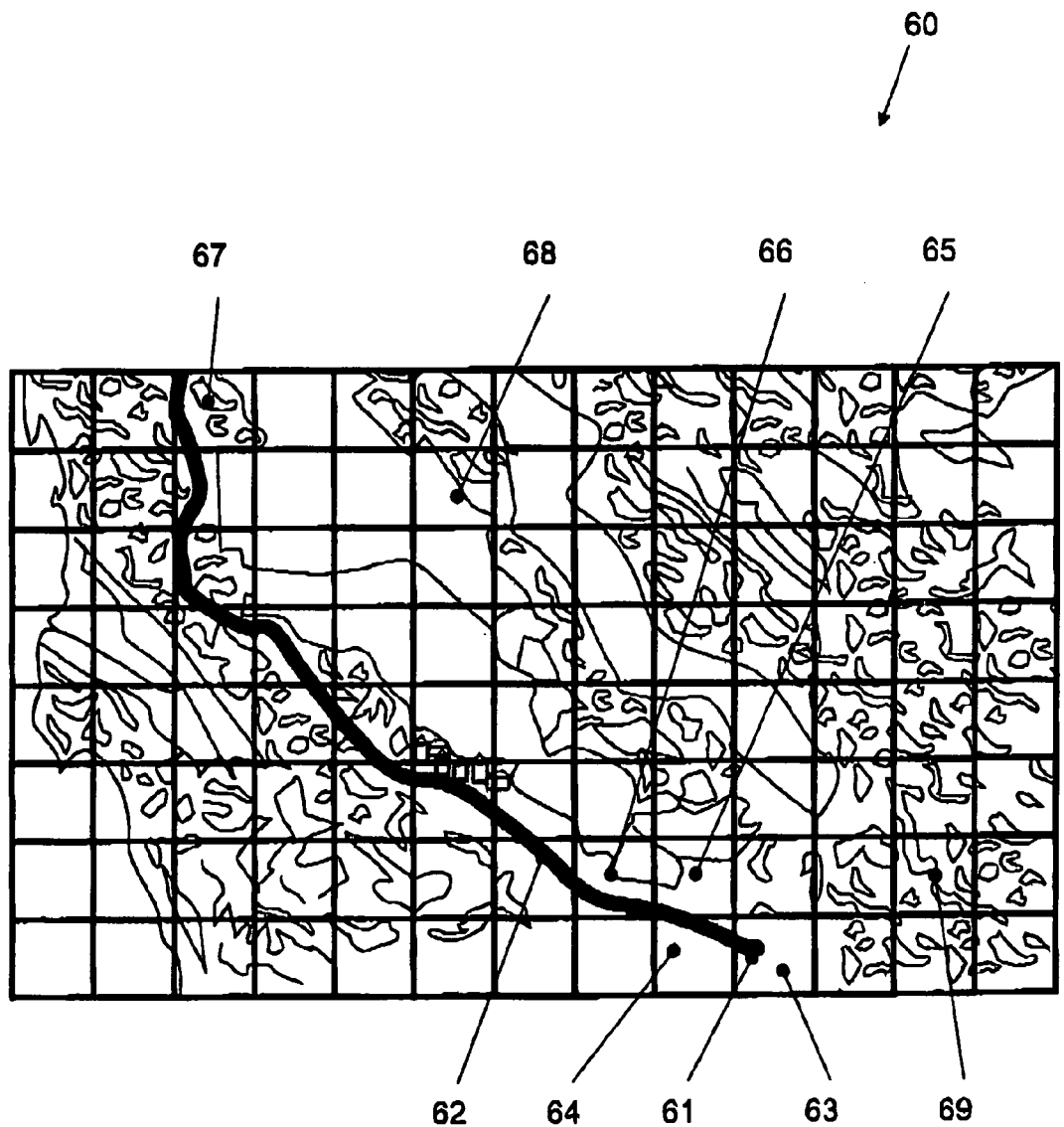
FIG. 5 illustrates an exemplary embodiment of a prioritization of map excerpts.

As an alternative or in addition, priority 58 of the navigation information item, for example with reference to FIG. 5, may also be a function of its distance 53 to position 61 of motor vehicle 2 and/or its distance 54 to a suggested route 62 for motor vehicle 2. Reference numeral 60 in FIG. 5 denotes a map display, which is subdivided into map excerpts 63, 64, 65, 66, 67, 68, 69. In the present exemplary embodiment, map excerpt 63 is assigned a higher priority than map excerpts 64, 65, 66. Map excerpts 64, 65, 66 are assigned a higher priority than map excerpt 67, and map excerpt 67 is assigned a higher priority than map excerpts 68, 69. Furthermore, it may be provided that map excerpts 68, 69 are transmitted at a lower resolution than map excerpts 63, 64, 65, 66, 67.

As an alternative or in addition, priority 58 of the navigation information item may also be a function of its recognition value 55. For example, it may be provided that a navigation information item having high recognition value is assigned a higher priority than a navigation information item having a low recognition value. A high recognition value may have, for example, a certain uniqueness or a visual distinctiveness. A navigation information item having a high recognition value is, for example, a navigation information item that offers a particularly good point of reference for orientation. A navigation information item having a high recognition value is, for example, a navigation information item that clearly stands out from its environment. For example, it may be provided that landmarks with a high recognition value are shown in greater detail than landmarks having a low recognition value. For example, the Transamerica Building in San Francisco may be shown in more detail than a regular housing block.

As an alternative or in addition, priority 58 of the navigation information item may also be a function of its safety relevance 56 and/or a user profile 57. For example, it may be provided that the navigation information items having safety relevance are assigned a higher priority. User profile 57 may include both a user profile and also an input of a user of motor vehicle 2 for setting or controlling priority 58.

Furthermore, in step 48, the encoded or compressed navigation information are stored in memory 28, for example, and decoded with the aid of a decoder 29, or decompressed, the sequence of the decoding or decompressing of the navigation information items being carried out as a function of its priority. For example, it may be provided that a navigation information item having a high priority is decoded or decompressed before a navigation information item having a low priority. Subsequently the decoded or decompressed navigation information item is imported into the on-board database and displayed with the aid of touch screen 21. It may also be provided that the encoded or compressed navigation information item is imported into the on-board database.

With respect to satellite images, it may be provided that a selection may be made from among different modes such as, for example, night mode, day mode, modes depending on the season, modes depending on the weather, etc. In addition, it may be provided that a map, a satellite image, and/or a 3-D graphical representation, etc., are/is augmented by information from on-board sensor system 27 (night vision, road-condition sensor system, etc.).

It may be provided that a suggested route is ascertained with the aid of navigation system 23. However, as an alternative or in addition, it may also be provided that the position of motor vehicle 2, the orientation of motor vehicle 2 and/or the on-board time as well as a destination input with the aid of touch screen 21 are/is transmitted to server 10 via Internet interface 22, the position of motor vehicle 2 also possibly being a variable from which the position of motor vehicle 2 is able to be determined, such as GPS signals received by motor vehicle 2. If, for example, the GPS signals received by the motor vehicle are transmitted to server 10, then it determines the position of motor vehicle 2 and the orientation of motor vehicle 2, and possibly the on-board time. Alternatively or additionally, server 10 may ascertain a suggested route as a function of the position of motor vehicle 2 and the input destination and transmits it to motor vehicle 2 via wireless communication connection 7.

Figure 6:
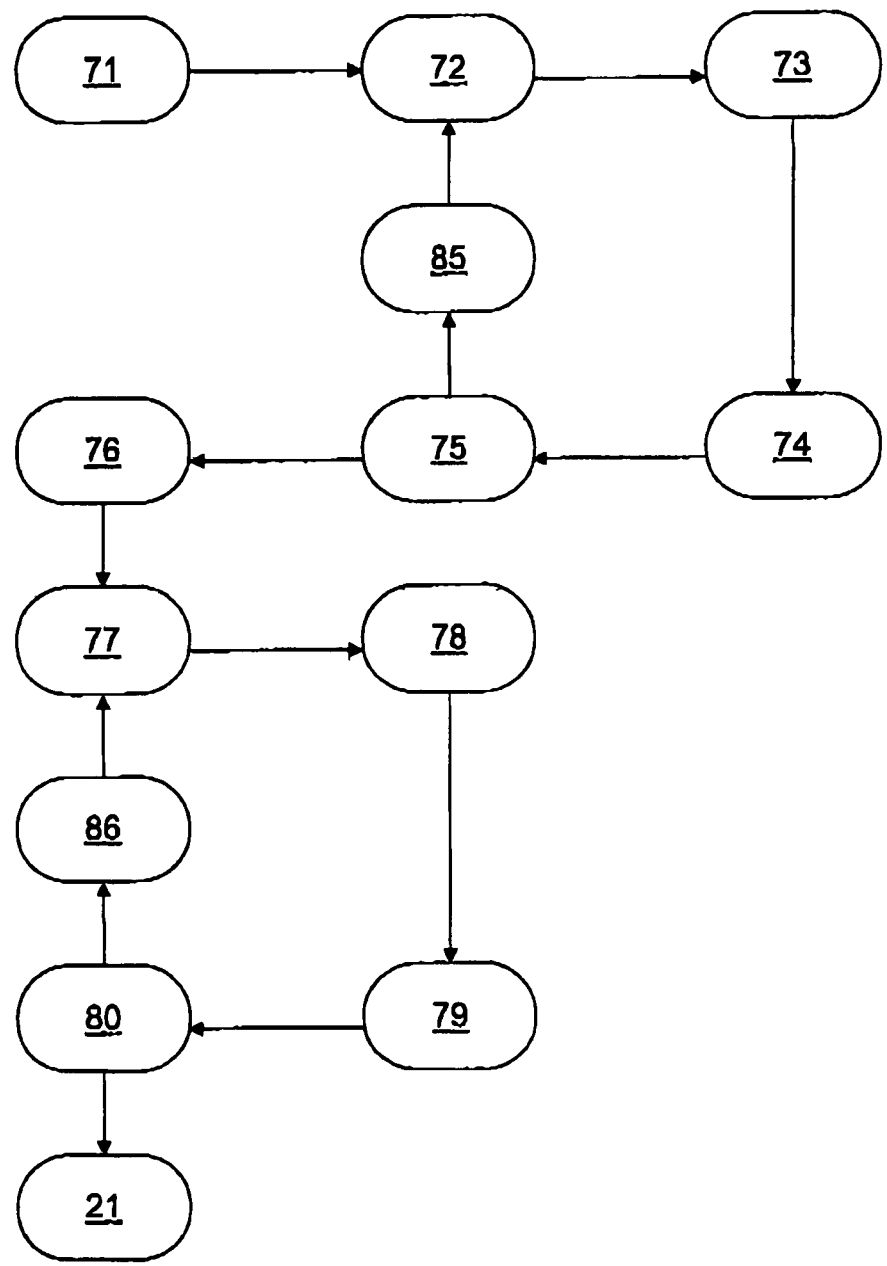
FIG. 6 illustrates an exemplary data flow.

The sequence described with reference to FIG. 3 may also be executed for a navigation information item having a specific priority or a priority group and subsequently be executed again for a navigation information item having a lower priority or priority groups. A corresponding exemplary data flow with respect to the execution of a path encompassing the steps 40, 41, 43 and 48 is illustrated in FIG. 6. Non-graphical navigation information is combined in a first priority group, and graphical navigation information is combined in a second priority group.

Triggered by an input according to step 40, a local search engine 71 searches in an on-board database 72 for non-graphical navigation information items (such as a route atlas). Subsequently, an online search engine 73 searches in a database 74, assigned to server 10, for non-graphical navigation information items in which the non-graphical navigation information items are compressed for the transmission. The result of this online search is an XML database 75 having sorted location and GPS data. This is compressed for storing. Such compressed data 85 are incorporated as update into on-board database 72.

Furthermore, a local search engine 76 searches in an on-board database 77 for graphical navigation information, e.g., map displays. Subsequently, an online search engine 78 searches in a database 79, assigned to server 10, for graphical navigation information items in which the graphical navigation information items are compressed for the transmission. This online search results in selected graphical navigation information items 80. These are compressed for storage. Such compressed navigation information items 86 are incorporated as update into on-board database 77. Furthermore, the desired navigation information items are displayed with the aid of touch screen 21 as explained, for example, with reference to FIGS. 7, 8 and 11 to 15.

The compression of XML database 75 with sorted location and GPS data and the graphical navigation information items may be implemented with the aid of decoder 29, for example, which may also be arranged as encoder. As an alternative, the data, which are already encoded for transmission, are imported into on-board database 72 or into on-board database 77. For example, it may be provided that the encoded data are editable and/or searchable. For compression, larger areas such as bodies of water and repeating pattern such as light masts, are indicated in stylized manner. Furthermore, as already mentioned, it may be provided that graphical information items having a certain distance to the position of motor vehicle 2 and/or a suggested route for motor vehicle 2 are indicated with less detail.

Figure 7:
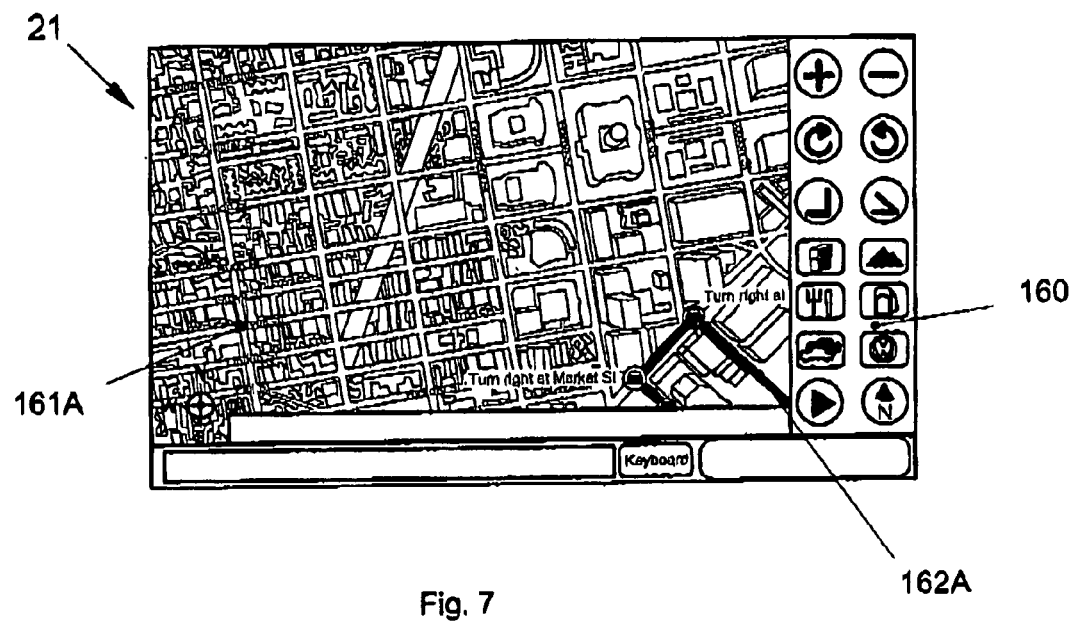
FIG. 7 illustrates an exemplary embodiment of an overhead view of a route integrated into a 3-D graphical representation, via a touch screen.
Figure 8:
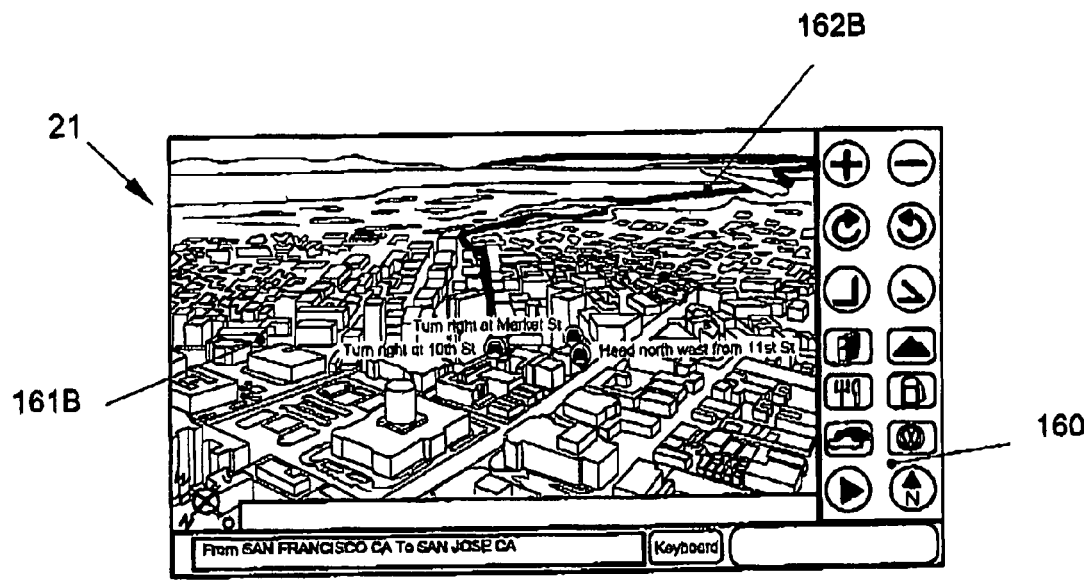
FIG. 8 illustrates an exemplary embodiment of a bird's-eye view of a route integrated into a 3-D graphical representation, via a touch screen.

FIG. 7 illustrates an exemplary embodiment of an overhead view display 161A of a suggested route 162A integrated in a 3D graphical illustration, with the aid of touch screen 21. An operator tool bar 160 is illustrated next to overhead view display 161A of 3D graphical illustration. Using this tool bar 160, the display may be modified and/or other and/or additional functions activated or operated. For example, toolbar 160 may be used to change overhead view display 161A of the 3-D graphical representation, selected in FIG. 7, into a bird's-eye view 161B, as illustrated in FIG. 8. Accordingly, suggested route 162B is displayed in a form integrated in the bird's-eye view.

FIG. 9 illustrates an exemplary embodiment of a display of an input mask for entering a starting and destination point with the aid of touch screen 21. In the exemplary embodiment illustrated, a starting point input field 170 and a destination input field 171 are provided for this purpose. The destination may be entered, e.g., alphanumerically, using a displayed keyboard 172. Alternatively, or in addition, the destination may also be entered via voice input or character recognition (e.g., a character recognition system for identifying Asiatic characters). The selection of a location may be done on a map, a satellite image and/or a 3D graphical representation, etc. For example, a zoom function for the map, the satellite image and/or the 3D graphical representation may be provided. The starting position may also be the current position of motor vehicle 2.

As illustrated in FIG. 10, it may also be provided that an operator of motor vehicle 2 is able to have a search conducted for a particular object (restaurant, landmark, store, gas station, etc.) in a particular search area (street, city, postal code, district, etc.). To this end, an input mask having an object-input field 175 for entering an object to be searched for (restaurant, landmark, store, gas station, etc.) and an area-input field 176 for entering the search area (street, city, postal code, district, etc.) are displayed. The operator may then select a hit from the offered hits ascertained with the aid of this search (e.g., in a map, in a satellite image, and/or in a 3-D graphical representation, etc.).

Figure 11:
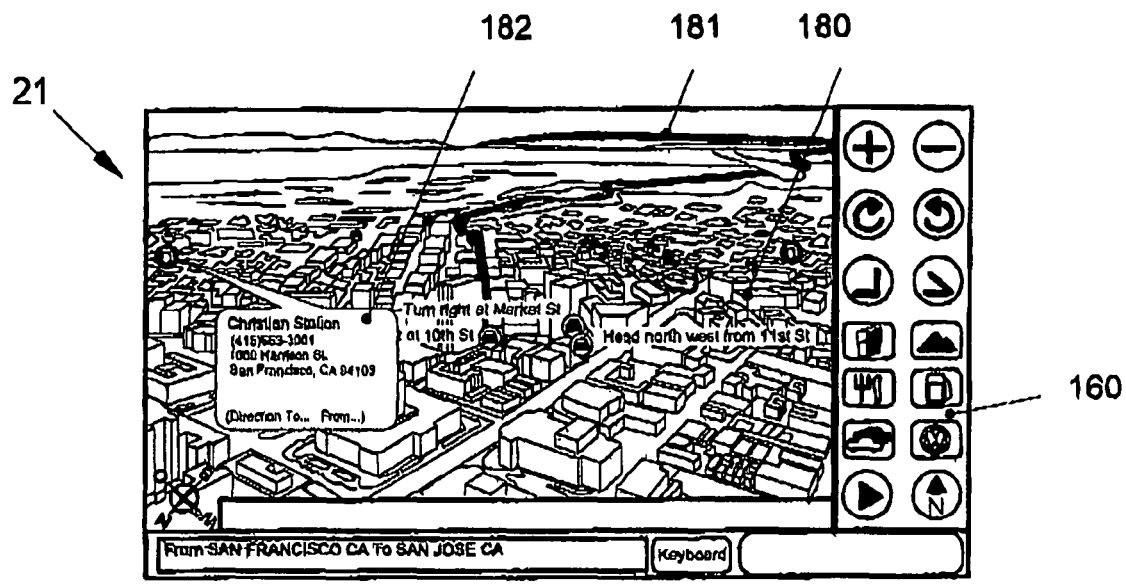
FIG. 11 illustrates an exemplary embodiment of a display for selecting preferred routes with the aid of a touch screen.

If the destination is entered via voice input, then the voice input may be confirmed graphically 182, as indicated in FIG. 11. As illustrated in FIG. 11, this graphic confirmation 182 may, for example, overlap a map display for a limited period of time. Thus, FIG. 11 illustrates, for example, a bird's-eye view 180 of a suggested route 181 integrated into a 3-D graphical representation, via touch screen 21.

Figure 12:
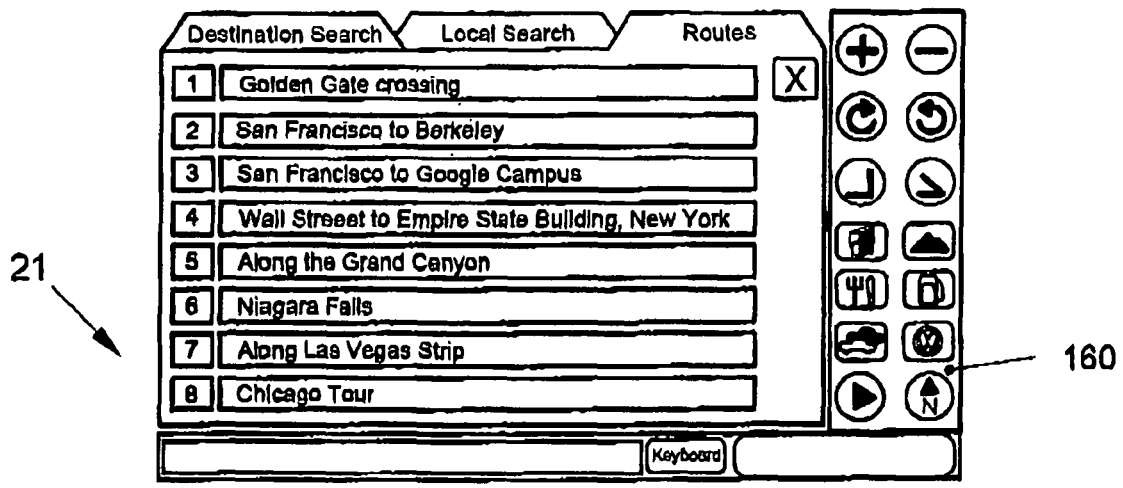
FIG. 12 illustrates an exemplary embodiment of the display of an overall view of a route, via a touch screen.

It may also be provided that preferred routes are selectable. FIG. 12, for example, illustrates an exemplary embodiment of a display for selecting preferred routes via touch screen 21.

An automatic destination selection or at least an interactively automatic destination selection may also be provided under certain conditions. For example, it may be provided that motor vehicle 2 transmits operational information of motor vehicle 2 (with the aid of wireless communication connection 7) or transmits it to server 10 (with the aid of wireless communication connection 7). In this regard, an operational information item of the motor vehicle may include, for example, the status of the fuel tank level, the oil level, or information regarding a defect, etc. If, for example, information that the tank is almost empty is transmitted, then navigation to the next gas station is offered and/or provided. If, for example, information that a specific defect is present is transmitted, then navigation to the next (suitable) service station is offered and/or provided.

Figure 13:
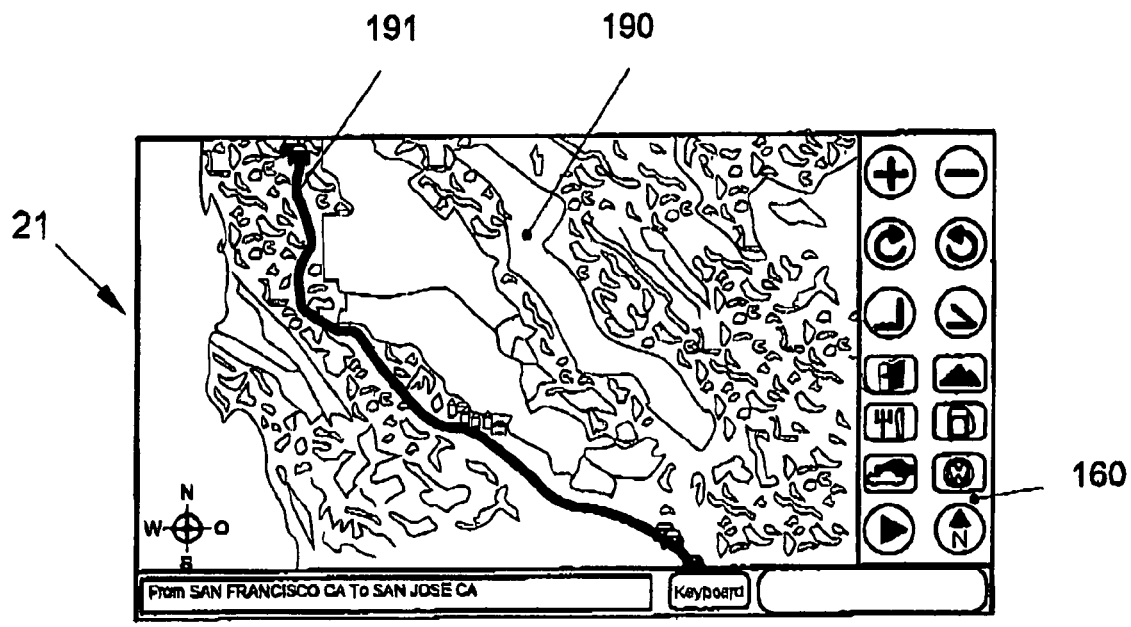
FIG. 13 illustrates an exemplary embodiment of a display for confirming a voice input via a touch screen.

FIG. 13 illustrates an exemplary embodiment of a display of a route overview by touch screen 21. Reference numeral 190 denotes a satellite image, and reference numeral 191 denotes a suggested route. The overall view of the route may also be implemented in a fly-through mode, e.g., from a bird's-eye view.

Figure 14:
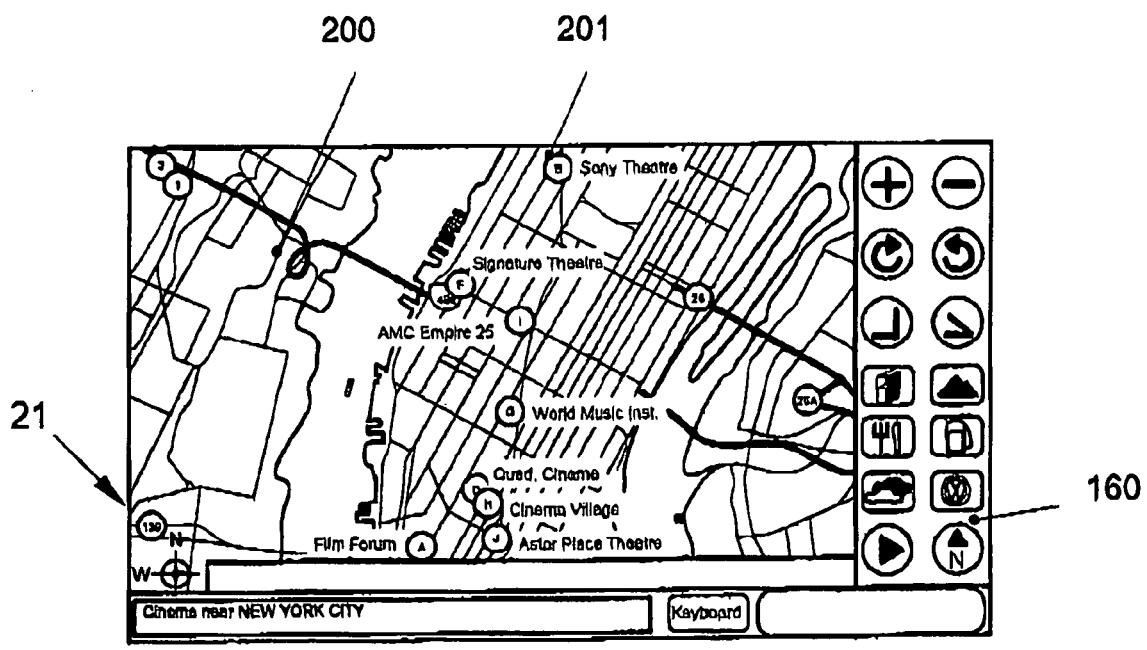
FIG. 14 illustrates an exemplary embodiment of a display of a satellite image augmented by information, via a touch screen.

As illustrated in FIG. 14, satellite images 200 may also be superposed or supplemented with additional information 201, such as streets, street names or designations, buildings, vehicles, traffic information, (optionally customized), POI's, call-out boxes, rest areas, etc. Special references to rest areas or parking areas may be provided, for example, when a specific driving time has been exceeded.

Figure 15:
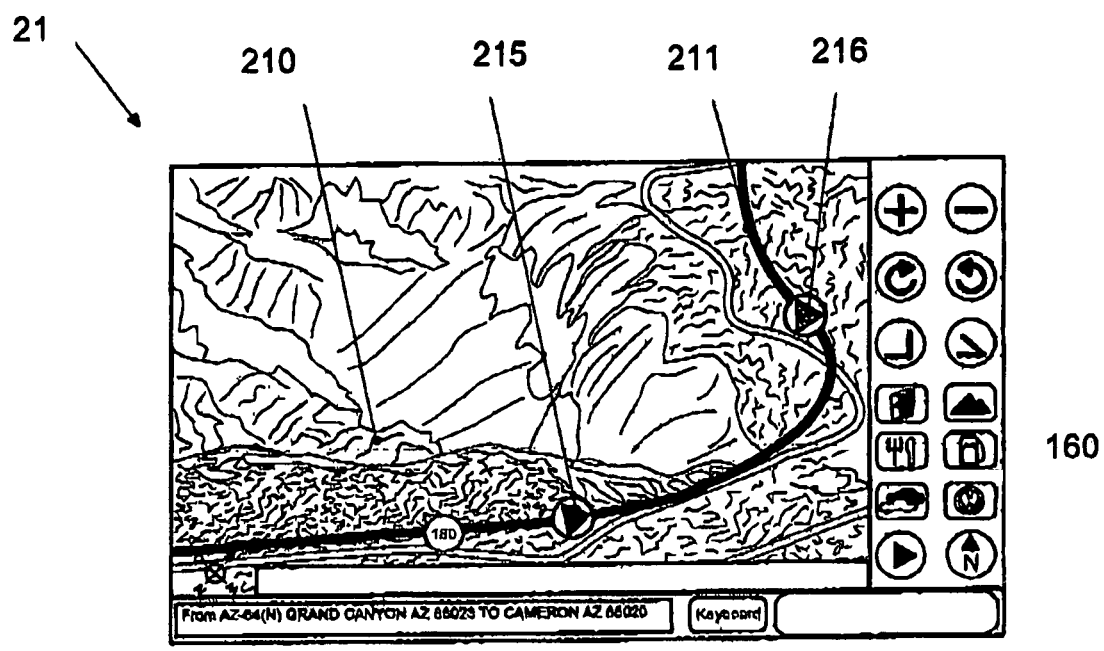
FIG. 15 illustrates an exemplary embodiment of an excerpt from a display of a suggested route, together with a follow-me function.

As illustrated in FIG. 15, a follow-me function may also be provided, where position 216 of a selected other motor vehicle is displayed on a map, a satellite image, and/or a 3-D graphical representation 210, e.g., in conjunction with position 215 of motor vehicle 2. In addition, a suggested route 211 may be displayed.

LIST OF REFERENCE NUMERALS

| | |
|---|---|
| 1 | navigation system |
| 2 | motor vehicle |
| 3 | satellite |
| 7 | communication connection |
| 10 | server |
| 11, 12, 14 | node |
| 15 | Internet |
| 20 | display control unit |
| 21 | touch screen |
| 22 | interface |
| 23 | on-board navigation system |
| 24 | infotainment system |
| 25 | telephone |
| 26 | climate control system |
| 27 | on-board sensor system |
| 28 | memory |
| 29 | decoder |
| 30 | position-finding system |
| 35 | bus system |
| 40, 41, 43, 45, 46, 48, 49 | step |
| 42, 44, 47 | query |
| 50 | prioritizer |
| 51 | update rate |
| 52 | size |
| 53 | distance to the position of a motor vehicle |
| 54 | distance to a suggested route for a motor vehicle |
| 55 | recognition value |
| 55 | safety relevance |
| 57 | user profile |
| 58 | priority |
| 60 | map display |
| 61, 215 | position of a motor vehicle |
| 62, 162A, 162B, 181, 191, 211, | suggested route |
| 63, 64, 65, 66, 67, 68, 69 | map excerpt |
| 71, 76 | local search engine |
| 72 | on-board database for non-graphical navigation information |
| 73, 78 | online search engine |
| 74 | database for non-graphical navigation information, assigned to a server |
| 75 | XML database |
| 77 | on-board database for non-graphical navigation information |
| 79 | database, assigned to a server, for graphical navigation information |
| 80 | selected graphical navigation information |
| 85 | compressed data |
| 86 | compressed graphical navigation information |
| 160 | toolbar |
| 161A | overhead view |
| 161B, 180 | bird's-eye view |
| 170 | starting-point input field |
| 171 | destination input field |
| 172 | keyboard |
| 175 | object input field |
| 176 | area input field |
| 182 | graphical confirmation |
| 190, 200 | satellite image |
| 201 | additional information |
| 210 | 3D-graphical illustration |
| 216 | position of a selected other motor vehicle |

What is claimed is:

1. A motor vehicle, comprising:
an interface for a wireless communication connection for time-staggered reception of a first navigation information item and a second navigation information item, the first navigation information item having a first priority level and the second navigation information item having a second priority level, a sequence of the reception of the first navigation information item and the second navigation information item being a function of the respective priority level of the first navigation information item and the second navigation information item; and
a man-machine interface adapted to output the first navigation information item and the second navigation information item to an operator of the motor vehicle;
wherein the priority of a navigation information item is settable by an operator of the motor vehicle as a function of at least one of:
(a) an update rate;
(b) a usual update rate;
(c) a size;
(d) a distance to a position of the motor vehicle;
(e) a distance to a suggested route for the motor vehicle;
(f) a recognition value;
(g) a safety relevance; and
(h) a user profile.

2. The motor vehicle according to claim 1, wherein the priority level of a navigation information item includes an excerpt from a map display.

3. The motor vehicle according to claim 2, wherein the priority level of the excerpt from the map display is a function of distance to a position of the motor vehicle.

4. The motor vehicle according to claim 2, wherein the priority level of the excerpt from the map display is a function of distance to a suggested route for the motor vehicle.

5. The motor vehicle according to claim 1, wherein the man-machine interface includes a monitor.

6. The motor vehicle according to claim 1, further comprising a navigation system.

7. The motor vehicle according to claim 1, wherein the first navigation information item and the second navigation information item are encoded, the motor vehicle further comprising a decoder adapted to decode the first encoded navigation information item and the second encoded navigation information item, a sequence of the decoding of the first navigation information item and the second navigation information item being a function of the respective priority level of the first navigation information and the second navigation information item.

8. The motor vehicle according to claim 1, further comprising a memory having a map display.

\* \* \* \* \*